UNITED STATES PATENT OFFICE.

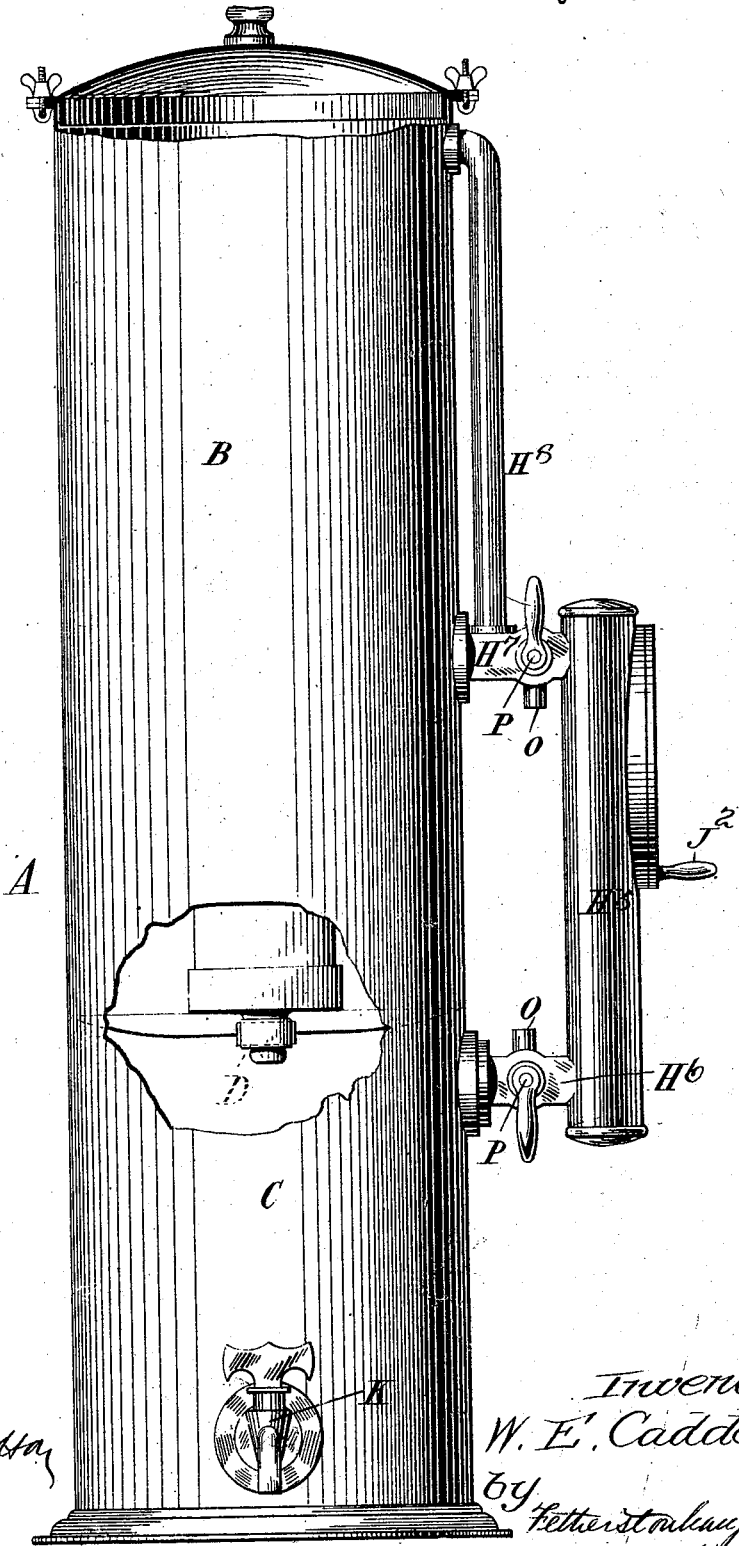

WILLIAM EDWARD CADDELL, OF LONDON, ENGLAND.

FILTER.

SPECIFICATION forming part of Letters Patent No. 502,030, dated July 25, 1893.

Application filed September 19, 1892. Serial No. 446,320. (No model.)

*To all whom it may concern:*

Be it known that I, WILLIAM EDWARD CADDELL, a subject of the Queen of England, residing at London, England, have invented certain new and useful Improvements in or Relating to Filters, of which the following is a specification.

This invention relates to filters, large or small which may be worked by power or by hand as required.

The chief object to be attained is to facilitate the flow of water through the filtering material and the invention will be understood by the following description and by reference to the accompanying drawing, in which the figure is a filter constructed in accordance with my invention designed to work with vacuum or with air pressure or with both.

Like letters represents like parts throughout the drawing.

A represents a vessel of metal or other suitable material divided into two chambers, B to contain the unfiltered water or other liquid, and C to contain the filtered water or other liquid, D being the diaphragm or division by which the chambers are separated. The filtering material, which is not shown may be in the form of a solid block, preferably of kieselguhr, or may be granular or other material carried in a suitable case or supported upon suitable frames or the like; the interior of the filtering material or that portion by which the filtered water escapes is connected with the chamber C.

As the material which I usually employ—kieselguhr—is of an exceedingly close nature I find it desirable to assist its action in some manner, and I accomplish this result by applying air pressure to the chamber of unfiltered liquid (which for this purpose would be constructed as an air-tight chamber), instead of or in addition to the vacuum in the chamber of filtered liquid. The pump therefore or equivalent apparatus, may be employed to force air into the chamber B or to suck air out of the chamber C, or both, the result depending merely upon the connections between the pump and the chambers. Thus the air sucked out of the chamber C instead of being discharged into the atmosphere may if desired be discharged into the chamber B so that the two operations may be performed at the same time, means such as a cock or valve being provided to enable external air to be pumped into B when the air in C has become too rarefied to be of service for increasing the pressure in B. An arrangement of this nature is illustrated in the figure, where the pump $H^5$ is shown with one connection $H^6$ to the chamber C and another connection $H^7$ communicating by the pipe $H^8$ with the chamber B. The connection $H^6$ has a branch O communicating with the atmosphere and a two-way cock P so that the pump $H^5$ by the branch $H^6$ may suck from the chamber C or from the atmosphere through the branch O. The connection $H^7$ is also provided with a branch O opening to the atmosphere and a two-way cock P so that the pump $H^5$ may by the connection $H^7$ discharge either into the atmosphere or by the pipe $H^8$ into the chamber B.

In some instances it is very important to be able to employ a vacuum—the more perfect the better—in the chamber of filtered liquid because by using a suitable filtering medium any germs contained in the liquid to be filtered may be sterilized or entirely removed so that if passing from the filtering material into a vacuum, and from there bottled and corked up without coming in contact with the atmospheric air, the liquid may be kept in a pure and wholesome condition for almost any length of time.

I claim—

In combination, with a filter containing two chambers with an interposed filtering medium, an air pump connected with both of said chambers and with the outside air, substantially as described.

In testimony whereof I have hereto set my hand in the presence of the two subscribing witnesses.

WILLIAM EDWARD CADDELL.

Witnesses:
ALFRED J. BOULT,
HARRY B. BRIDGE.